Patented Oct. 30, 1928.

1,689,842

UNITED STATES PATENT OFFICE.

SIDNEY RAUSCHENBERG, OF SAN DIEGO, CALIFORNIA.

IMPIGMENTED EXFOLIATED SHELL AND METHOD OF PRODUCING THE SAME.

No Drawing.   Application filed May 17, 1924. Serial No. 714,149.

My invention relates to impigmented exfoliated shell, more particularly pearl shell, and to a method for producing the same, and the objects of my invention are: First, to provide natural shell in sheets, layers, laminations or exfoliations of various colors and shades for decorative purposes; second, to provide impigmented exfoliated natural shell materials of various colors and shades such as may be used for interior, exterior or other decorations; third, to provide exfoliated shell materials impigmented with inorganic or organic pigments precipitated or deposited into, upon or between the laminæ of the shell material; fourth, to provide natural shell flakes which impart brilliance, iridescence, scintillation, high lights and relief with added colors and shades, thus adding to their decorative qualities, and fifth, to provide a new and novel method of producing impigmented exfoliated shell of all kinds and classes.

With these and other objects in view, as will appear hereinafter, my invention consists of a certain product of impigmented exfoliated shell and the certain novel method of producing the same, as will be hereinafter described in detail and particularly set forth in the appended claims.

Plain or natural exfoliated shell imparts a beauty of iridescence peculiarly its own, but it does not impart the splendor or color procurable from the same shell when treated with inorganic or organic pigments. When so treated the exfoliations, luminæ or flakes take on the richness, beauty and iridescence of gems or the subdued pastel shades, according to the size of the flakes and the intensity of color imparted to them.

Impigmented exfoliated shell lends itself to every character of decorations for it readily adheres to freshly varnished, painted, enameled, or any adhesive surface, and may be used upon walls, ceilings, domes, woodwork, building board, staff, plaster, plastic or other cements, hollow tile, brick, metallic surfaces, wall paper, window and art glass, glass furniture tops, screens, window displays, theatrical scenery, theatrical decorations, motion picture settings, curtains, costumes, hats, fabrics, and on a multitudinous number of other objects and places.

In my specification I use the words: "impigment", "impigmented" and "impigmentation" to designate in every particular, in every instance and in full the act or state of being impigmented, stained, dyed, colored, coated and covered with inorganic or organic pigments.

Exfoliated shell derived from the various shells varies in texture, grain or density of the laminæ, and therfore the absorption thereby of organic or inorganic pigments varies; consequently my method of impigmentation may vary. In general, my method consists of treating exfoliated shell with a suitable chemical solution, whether inorganic or organic, either with or without the aid of heat, to impregnate the laminæ with said solution, then, with a suitable chemical precipitant, developing, precipitating or depositing the pigment, formed from the resultant precipitate, into, upon or between the laminæ. This latter step may also be accomplished with or without the aid of heat. The excess of pigment is then removed by washing.

By this method, with slight individual changes to complete the chemical reaction, all of the inorganic pigments used in the art of color production by precipitation may be precipitated and fixed into, upon or between the laminæ of exfoliated pearl shell, many of which pigments are either light-proof or substantially permanent colors.

By the same method organic pigments may be precipitated or fixed into, upon or between the laminæ for producing colors of greater brilliancy. The colors thus produced are more fugitive than those produced by inorganic precipitates but are well suited to interior decorations.

The following is a specific instance of the application of the method as applied to inorganic pigments:

Take argentic nitrate and potassic dichromate in molecular proportions and dissolve each separately in distilled water; render the argentic nitrate solution alkaline with ammonic hydrate; cover a portion of exfoliated shell contained in a suitable vessel with the argentic nitrate solution and boil, keeping the same at a boiling point for 30 to 45 minutes, with frequent stirring; then add the potasic dichromate solution in small portions, stirring constantly for 30 minutes to precipitate the chemicals and to fix the precipitate formed; and then wash with water. The resultant product will be a beautiful yellow or orange according to whether the reaction is carried out for argentic chromate or dichromate.

When argentic oxide, argentic chromate, argentic dichromate, argentic iodide, chromic oxide, cadmic chromate, zinc chromate and plumbic and plumbous chromates are used, different colored pigments or shades of red, yellow, green and brown are imparted to the shell. When manganous and ferric salts are used, different shades of brown, buff and red are imparted. When ferric ferricyanide is used, different shades of blue are produced. All other precipitable inorganic pigments are likewise producible for coloring shell.

An instance of the application of the method of impigmenting with organic pigments is as follows:

Take a sufficient quantity of the desired synthetic color, which may be assumed to be xylidine ponceau, to produce the desired shade of red for a weighed amount of exfoliated shell, and dissolve same in a sufficient amount of water; then add the exfoliated shell and keep at the boiling point for 30 to 60 minutes; then add the proper preciptant or fixing agent, which may be assumed to be aluminum sulphate, in sufficient quantity to preciptate, in order to fix the color, and boil for 30 minutes; then wash and dry the resultant red colored pigmented shell.

Though I have described a certain impigmented exfoliated shell product and a certain method of producing the same, I do not wish to bind or limit myself to the specific product, nor to any specific quantities or proportions, nor to the kind, kinds, combinations or mixtures of pigments, stains, dyes or colors to obtain my results in impigmenting exfoliated shell derived from various shells varying in texture, grain or density of laminæ, which vary in absorption of pigments, nor to the particular method described, but desire to include in the scope of my invention the product and method substantially as set forth in the appended claims.

Having thus described my invention, what I claim as new and desire to secure by Letters Patent, is:

1. A product of manufacture, consisting of flaked natural shell exfoliations colored by chemical precipitates.

2. A product of manufacture, consisting of natural shell exfoliations, and a color preciptate deposited into, upon and between the laminæ of the exfoliations.

3. A product of manufacture, consisting of natural mother-of-pearl material colored with a color precipitate deposited into and between the laminæ thereof.

4. A product of manufacture, consisting of natural mother-of-pearl shell material colored by chemical precipitates forming coloring matter within and between the laminæ of said shell material.

5. The herein described method of producing colored flaked natural shell, consisting in immersing flaked natural shell in a chemical solution, and then adding a colored precipitate-forming chemical to the mixture.

6. The herein described method of producing colored flaked natural shell material, consisting in saturating flaked natural shell material with a chemical solution, then subjecting said chemically saturated shell material to a colored precipitate-forming chemical.

7. The herein described method of producing impigmented exfoliated shell, consisting in immersing exfoliated natural shell in flaked form in a chemical solution, and then adding a precipitate-forming solution to the mixture.

8. The herein described method of producing impigmented exfoliated shell, consisting in immersing exfoliated natural shell in flaked form in a chemical solution, then boiling and stirring the mixture, then adding a precipitate-forming chemical solution to the above mixture, and then boiling and stirring the whole.

9. The herein described method of producing impigmented exfoliated shell, consisting in immersing exfoliated natural shell in flaked form in a chemical solution, then boiling and stirring the mixture, then adding a precipitate-forming chemical solution to the above mixture, then boiling and stirring the whole, then separating the shell material from said chemicals, and then washing the impigmented shell material.

10. The herein described method of producing impigmented exfoliated shell, consisting in immersing exfoliated natural shell material in flake form in an alkali-treated, metallic salt solution, and then adding a precipitate-forming chemical to said solution.

11. The herein described method of producing impigmented exfoliated shell, consisting in immersing exfoliated natural shell material in flake form in an alkali-treated, metallic salt solution, then boiling and stirring the mixture, then adding a precipitate-forming chemical to the solution, then boiling and stirring the whole, then removing said shell from said solution, and then washing said shell.

In testimony whereof, I have hereunto set my hand at San Diego, California, this 10th day of May, 1924.

SIDNEY RAUSCHENBERG.